July 31, 1928.　　　　　　　　　　　　　　　　1,678,945
C. E. JONES
FRICTIONAL DRIVING MECHANISM FOR MACHINES HAVING STOP_MOTIONS
Filed Feb. 6, 1925　　　　9 Sheets-Sheet 3

INVENTOR:
CHARLES E. JONES

July 31, 1928.

C. E. JONES 1,678,945

FRICTIONAL DRIVING MECHANISM FOR MACHINES HAVING STOP MOTIONS

Filed Feb. 6, 1925　　9 Sheets-Sheet 4

INVENTOR:
CHARLES E. JONES

July 31, 1928.

C. E. JONES 1,678,945

FRICTIONAL DRIVING MECHANISM FOR MACHINES HAVING STOP MOTIONS

Filed Feb. 6, 1925

INVENTOR:
CHARLES E. JONES

July 31, 1928.

C. E. JONES

1,678,945

FRICTIONAL DRIVING MECHANISM FOR MACHINES HAVING STOP MOTIONS

Filed Feb. 6, 1925

INVENTOR:
CHARLES E. JONES.

Patented July 31, 1928.

1,678,945

UNITED STATES PATENT OFFICE.

CHARLES EDWARD JONES, OF BRADFORD, ENGLAND.

FRICTIONAL DRIVING MECHANISM FOR MACHINES HAVING STOP MOTIONS.

Application filed February 6, 1925, Serial No. 7,313, and in Great Britain February 9, 1924.

This invention relates to driving mechanisms, and is specially applicable to machinery having automatic stop motions, such for example as spinning or weaving machinery, in which the stop motion is actuated upon the derangement of the spinning or weaving process, or power operated machinery for opening and closing valves and the like, in which the stop motion comprises a part having movement corresponding with the valve, say a sliding nut or a screw geared to the valve closing means.

It is necessary in order to ensure uniformity of product that, when a loom is stopped during the process of weaving, the deceleration should be very rapid; a sudden stoppage is obtained upon the actuation of the usual automatic stop motion which, by mechanical means positively arrests a part of the loom mechanism, but such sudden stopping in looms driven in accordance with existing practice severely strains the loom mechanism and the speed reduction gear, because the loom is not disconnected from the driving means at the instant it is stopped.

Further, when a loom has been stopped during the process of weaving it is necessary that it should be started up quickly, that is to say the acceleration should be very rapid, otherwise the fabric is not uniform in quality.

In most types of machines fitted with automatic stop motions it is necessary that the deceleration or stopping should be rapid, for instance in power operated valve closing and opening means, if the closing means be not stopped immediately the valve is closed, damage to the valve or its seating results; further, it is desirable, when the valve has to be opened by gear operated by an electro-motor, particularly by a motor with a squirrel cage rotor, that the motor should be free to attain its maximum speed before the valve opening mechanism is operated; and the object of the present invention is to provide a driving mechanism which may be arranged when the driven machine or gear is started or stopped, whether by hand or automatically to comply with requirements such as those enumerated.

According to the invention the driving mechanism comprises an electro-motor; a friction clutch operated by the action of centrifugal force on rotating weights driven by the motor, through which clutch the drive is transmitted from the motor to the machine or gear to be driven; and controlling means connected to the starting and stopping handle, or to the automatic stop motion of the machine or gear, or to both handle and stop motion, either directly or through electro-magnetic means, said controlling means being so arranged as to connect the motor to and disconnect it from the machine or gear at starting and stopping, and to control the rotating weights so as to determine the proportion of and the time at which the pressure, due to the action of centrifugal force on the weights, is utilized to provide the engaging pressure between the clutch members.

In the preferred arrangement the clutch controlling means and the switch controlling the electric supply to the motor are operated together; and where the clutch controlling means are operated by a solenoid, the winding of the latter and the stator windings of the motor are connected in parallel and controlled by the same switch gear; the clutch parts are preferably so constructed and disposed that they may be mounted on the motor shaft and be housed in the motor casing, and be connected to the clutch controlling means by a rod sliding in the motor shaft.

The invention also comprises means whereby the action of the clutch controlling means is in turn controlled by time-lag devices or by devices of the dash-pot type; and in the case of driving mechanisms for power-operated valve closing and opening gear, comprises electric switch gear, including a limit switch, operated by the sliding nut or the like automatic stop motions fitted to such gear, said switch gear being adapted to control the electro-magnetic devices by which the clutch control gear is operated, to control the supply of current to the motor, to effect the reversal of the motor connections at the opposite ends of the valve movement, and to control "inching" movements of the gear.

I have illustrated my invention in the accompanying drawings, in which:—

Figs. 1 to 6 illustrate the invention as applied to driving mechanisms for spinning machines, weaving machines or the like fitted with a stop motion.

Figs. 6, $6^A$ and $6^B$ are plan views of modifications.

Figs. 3 to 6 are drawn to a smaller scale than Fig. 1.

Figs. 7, 8 and $8^A$ show the invention applied to driving mechanisms for power operated machinery adapted to open or close a stop valve.

Figs. 9 and 10 illustrate a modification of the arrangement of Figs. 7 and 8, in which the clutch members, and the rotating weights are located at opposite ends of the motor casing.

In Figs. 1 to 10;—A is the electric motor which is preferably of the squirrel cage rotor type; $a^1$ the enclosing casing; $a^2$ the main bearings of the motor; $a^3$ the stator windings; $a^4$ the rotor core; $a^5$ the rotor bars; $a^6$ the rotor end-connections; and B the rotor shaft; all of which parts may be of any usual or suitable construction.

Referring now to Figs. 1 to 6;—C are the rotating weights each mounted on a bellcrank lever $c^1$, $c^2$, pivoted at $c^3$ to a carrier I keyed on the part $b^1$ of the motor shaft B. $d$ and $e$ are the frictional driving surfaces of the two members D and E of the clutch, the member D being driven by the motor and the member E being geared to the machine or gear to be driven by the motor, say by a sprocket wheel $e^3$. The part $b^1$ of the shaft B is provided with a transverse slot in which a cotter $b^2$ is fitted, against which cotter bears the end of the clutch control rod F, adapted to slide in the concentric bore $b^3$ of the shaft B; the cotter passes through a corresponding slot in the boss of the carrier I, so that the cotter is capable of axial movement relatively to the shaft B and carrier I. The ends of the cotter $b^2$ fit in radial recesses formed in the bore of the boss $d^1$ of the clutch member D, which boss is a sliding fit on the boss of the carrier I, a cap $d^2$ locates the cotter axially relating to the clutch member D so that the latter sides with the cotter; the carrier and the clutch member D are driven by the shaft B through the cotter $b^2$. The ends of the arms $c^2$ of the bell-crank levers fit into recesses $d^6$ formed in the periphery of the clutch member D. The clutch member E is freely mounted on the part $b^4$ of the motor shaft on which part it is held against axial movement along the shaft by the shoulder on the shaft by the end nut $e^1$.

Figures 1, 2:
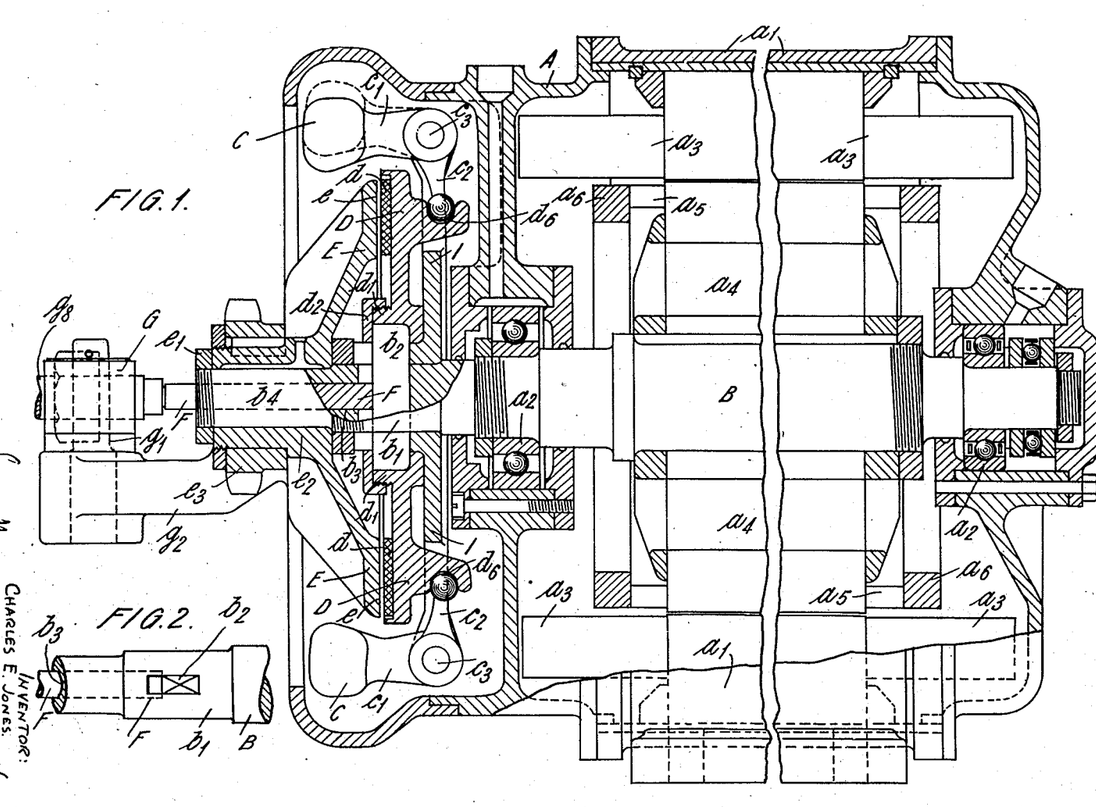
Fig. 1 is an elevation in medial longitudinal section showing the arrangement of the electric motor, the clutch elements, the rotating weights and the clutch control means.
Fig. 2 is a fragmentary view of a detail.
Figure 3:
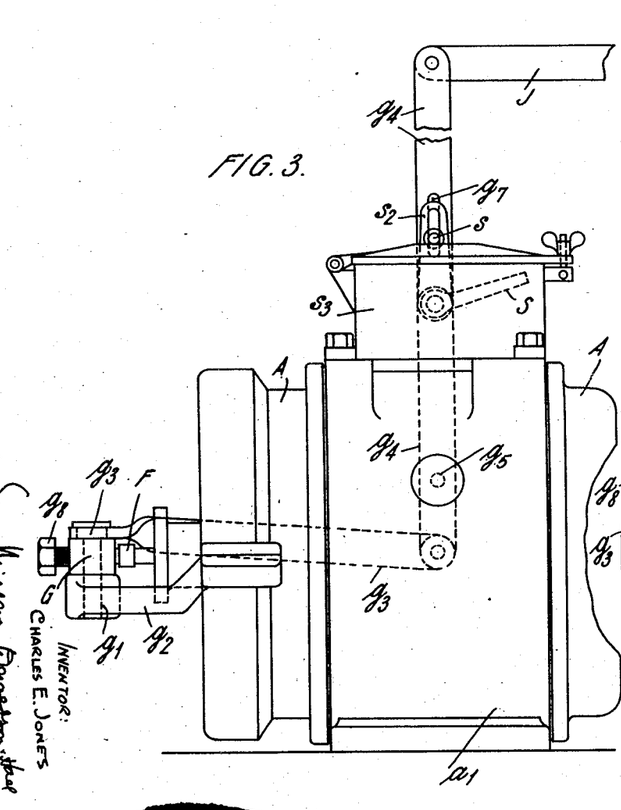
Fig. 3 is an outside elevation, showing the mode of connection to the stop motion and motor switch.
Figure 4:
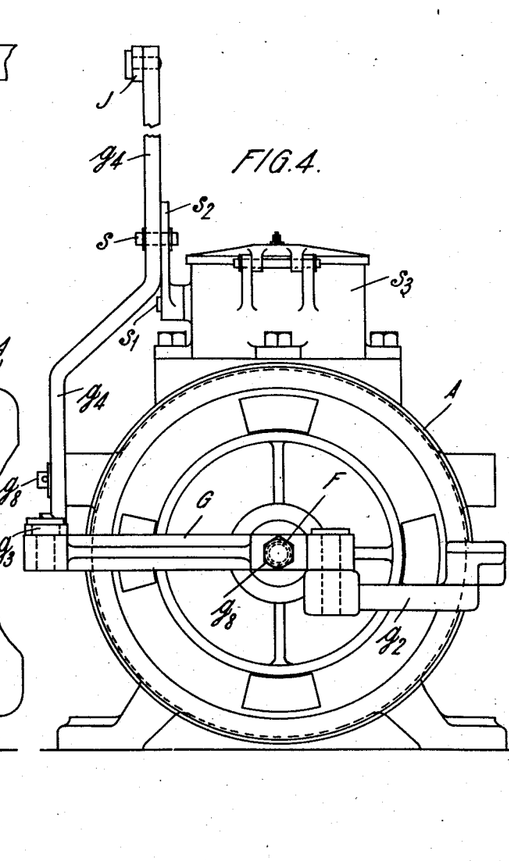
Fig. 4 is a corresponding end elevation.

When the motor shaft is rotated the weights C tend to fly outwardly to the positions shown in dotted lines in Fig. 1, and the lever arms $c^2$ press the clutch member D axially into engaging contact with the clutch member E, and when the actuating rod F and cotter $b^2$ are free to move axially to the left, the engaging pressure is sufficient to transmit the necessary power from the motor to the clutch member E, and the movement of the latter is transmitted to the loom or other machine in any convenient manner, through the sprocket wheel $e^3$ keyed on the boss $e^2$ of the clutch member E.

The actuating rod F is controlled by a lever G pivoted at $g^1$ to the bracket $g^2$, and connected by a rod $g^3$ to a lever $g^4$ pivoted on the fixed pivot $g^5$, and connected at its upper end by a rod J to the starting and stopping handle of the machine (referred to hereinafter as the machine handle) or to the automatic stop motion, or to both. The lever $g^4$ is slotted at $g^7$ to take the pins $s$ of a lever $s^2$ fixed to the shaft $s^1$ of a switch S (see Fig. 11 which shows the connections) contained in the box $s^3$, which switch controls the electric supply to the motor windings $a^3$. When the rod J is actuated either by the machine handle, or by the stop motion, to stop the machine, the lever G is operated so that the adjustable screw $g^8$ engages with the rod F pressing the latter inwardly, and by controlling the rotating weights through the clutch member D relieving the surfaces $d$ and $e$ of the clutch members D and E from engaging pressure, and so disconnecting the machine from the motor; when motion in the reverse direction is given to the rod J the lever G is moved so as to relieve the pressure between the screw $g^8$ and the rod F, and thus permit the moving weights C to transmit the desired pressure through the said surfaces $d$ and $e$.

Figure 5:
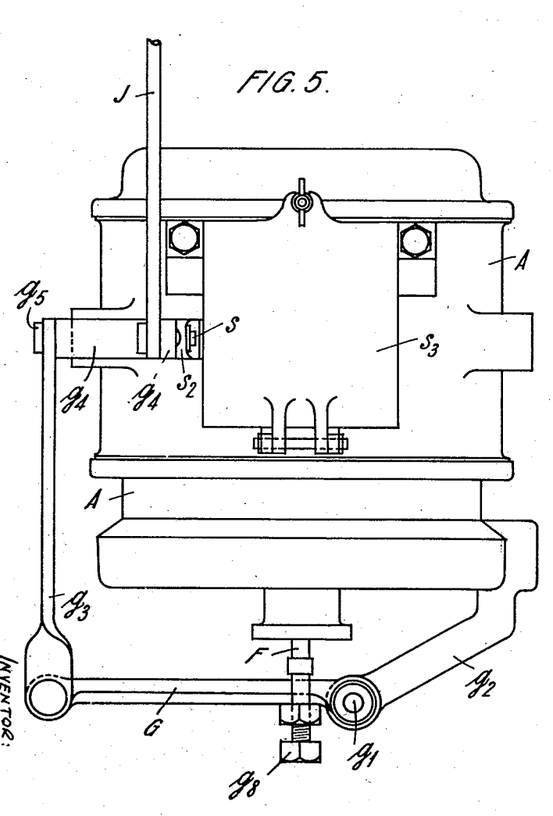
Fig. 5 a corresponding plan.
Figures 6, 6A, 6B, 8A:
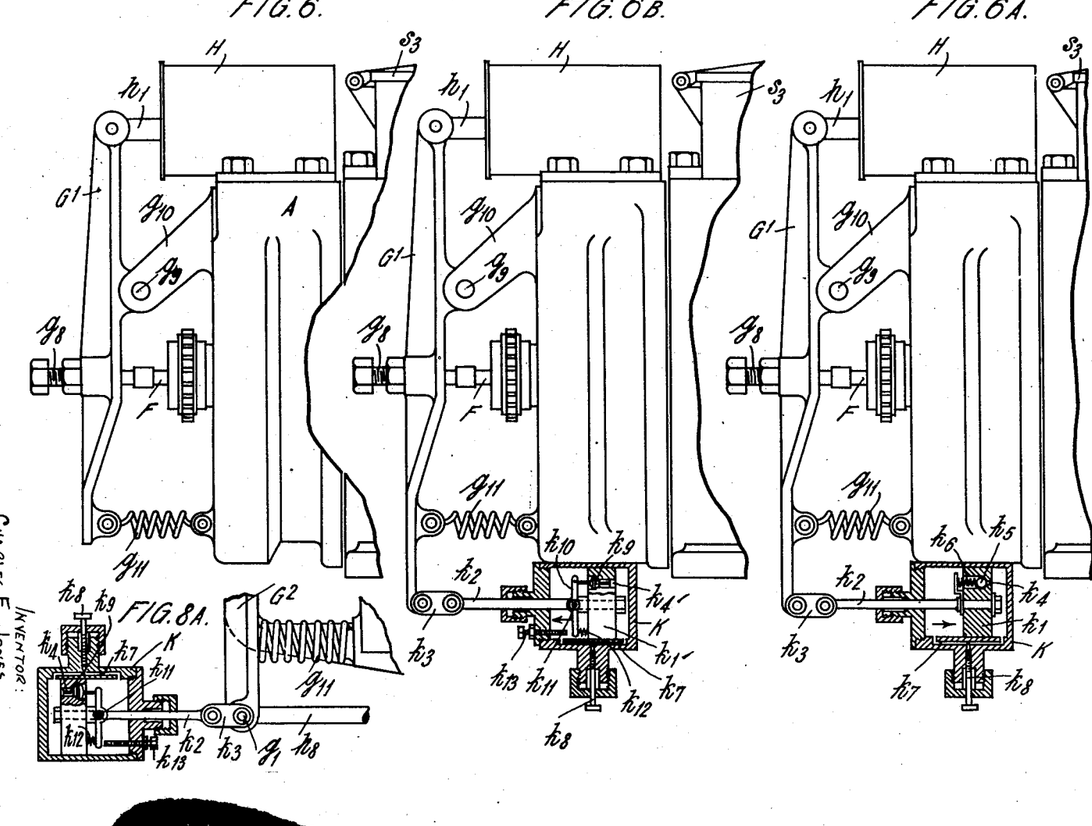

In some cases it is desirable to operate the control lever G electro-magnetically, and this modification is shown in Fig. 6, which is a part plan view corresponding with Fig. 5. The lever G' is pivoted at $g^9$ to the fixed bracket $g^{10}$, and is fitted at one end with a spring $g^{11}$, the other end being connected by a rod $h^1$ to the plunger of a solenoid H controlled by a switch $h^2$ (see Fig. 12). The switch is controlled by the rod J connected to the machine handle or the stop motion. When the machine is stopped the solenoid H is de-energized, whereupon the spring $g^{11}$ operates the lever G' so that the latter relieves the surfaces $d$ and $e$ from the pressure due to the centrifugal force acting on the weights C, as described in connection with Figs. 1 to 5; when the machine is started again the stop motion rod J closes the switch $h^2$, whereupon the solenoid H is energized, and the lever G' is moved by the solenoid in opposition to the spring $g^{11}$ so as to relieve the pressure on the control rod F and permit the weights C to transmit pressure through the surfaces $d$ and $e$. Preferably when a solenoid such as H is fitted, its winding $h^3$ is connected in parallel with the stator winding $a^3$ of the motor, (see Fig. 13), so as to control the electric supply both to the solenoid and to the motor.

The action of the lever G' whether operated through electro-magnetic means such as a solenoid H, or directly by the rod J, is preferably controlled by a dashpot. In Fig. 6$^A$ the dashpot K has a piston $k^1$ connected by a rod $k^2$ and link $k^3$ with the lever G'; the piston $k^1$ has a through port $k^4$ fitted with a valve $k^5$ controlled by a spring $k^6$, the arrangement being such that when a stroke in the direction of the arrow is made the liquid contained in the dashpot cylinder passes freely from one side of the piston to the other through the port $k^4$. Movement in the opposite direction is retarded, the valve $k^5$ closing and the liquid having to pass through a communicating passage way $k^7$, the resistance to flow being regulable by a needle valve $k^8$.

In Fig. 6$^B$ the arrangement is similar except that the port $k^{4\prime}$ in the piston K$^{1\prime}$ of the dash pot K is now controlled by a valve $k^9$, the spindle of which is connected to the lever $k^{10}$ pivoted on the piston at $k^{11}$ and fitted with a spring $k^{12}$ which normally maintains the valve closed. Towards the end of the stroke in the direction of the arrow the lever $k^{10}$ engages with an adjustable screw $k^{13}$ and opens the valve, this allows the latter part of the stroke in the direction of the arrow to be made without retardation.

In Figs. 6$^A$ and 6$^B$ the lever G' is shown controlled by the solenoid H but either of the dashpot arrangements described is equally applicable to those cases in which the lever G' is controlled mechanically as described in connection with Fig. 5.

Figures 8, 12, 13, 14:
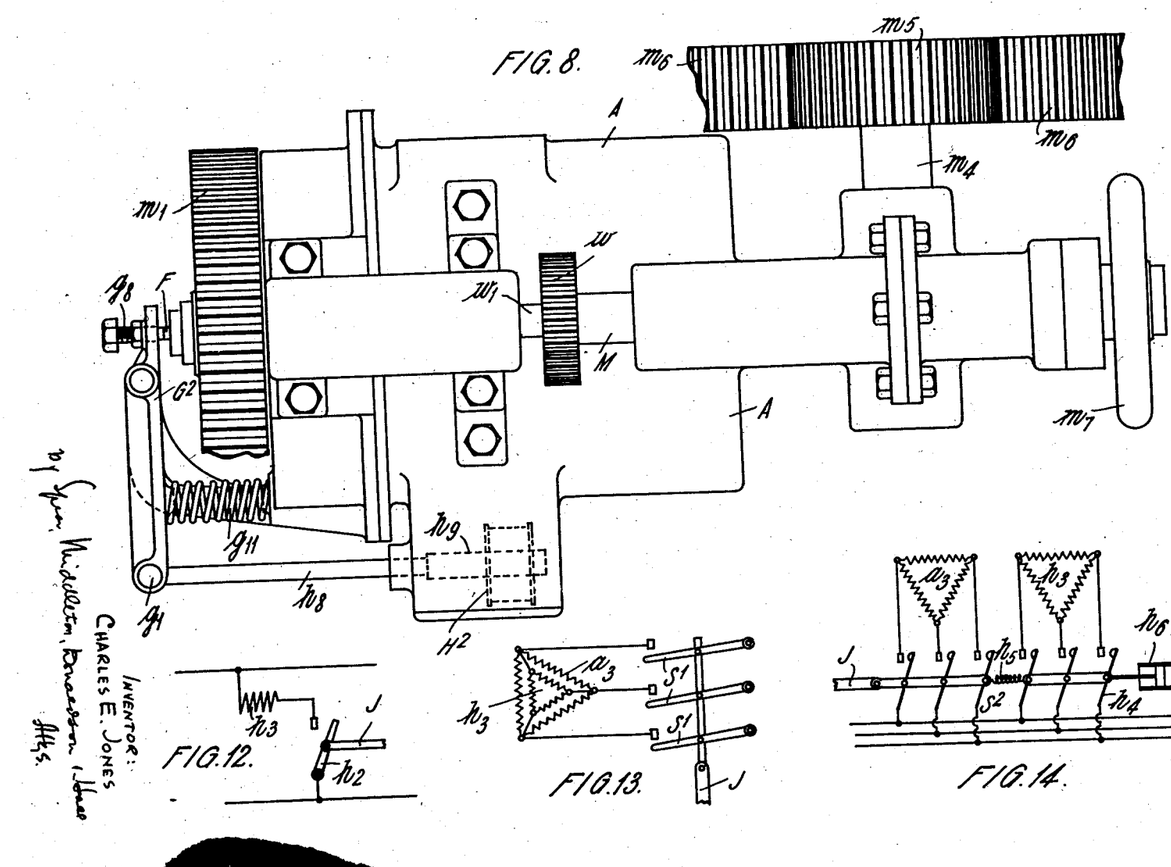
Fig. 8 being a corresponding plan and Fig. $8^A$ a part plan showing a dashpot attachment.
Figs. 11 to 17 are diagrams showing the connections of suitable types of electrical control gear.

The dashpot (as arranged in Fig. 6$^A$), or equivalent arrangement, is fitted in those cases, in spinning machinery for example, in which it is desired to have a gradual acceleration in starting-up. The arrangement of Fig. 6$^B$ is fitted when it is desired to delay, for an interval after the motor has been started, the actual clutching action, until the final part of the stroke of the dashpot piston occurs which happens after the valve $k^4$ has been opened by the lever $k^{10}$; this gives a time interval during which the motor can speed-up after it and the solenoid H have been connected to the supply mains, and before the rotating weights are permitted to cause the engagement of the clutch elements, this produces rapid acceleration of the machine to be driven; the same effect may be obtained without dashpots or the like connections to the control lever, by arranging for a time interval between the connection of the motor to the supply mains and the connection of the solenoid to the said mains. Such an arrangement is shown in Fig. 14; $a^3$ is the stator winding of the motor, and $h^3$ the winding of the solenoid; S$^2$ is the motor control switch connected to the stop motion rod J, and $h^4$ is a switch adapted to connect the solenoid winding $h^3$ to the mains; the switch $h^4$ is connected to the switch S$^2$ by elastic means $h^5$ which yield in tension, but not in compression; and the switch $h^4$ is connected to a dashpot device $h^6$ which retards the closing of the switch $h^4$ after the switch S$^2$ has been closed.

Figure 7:
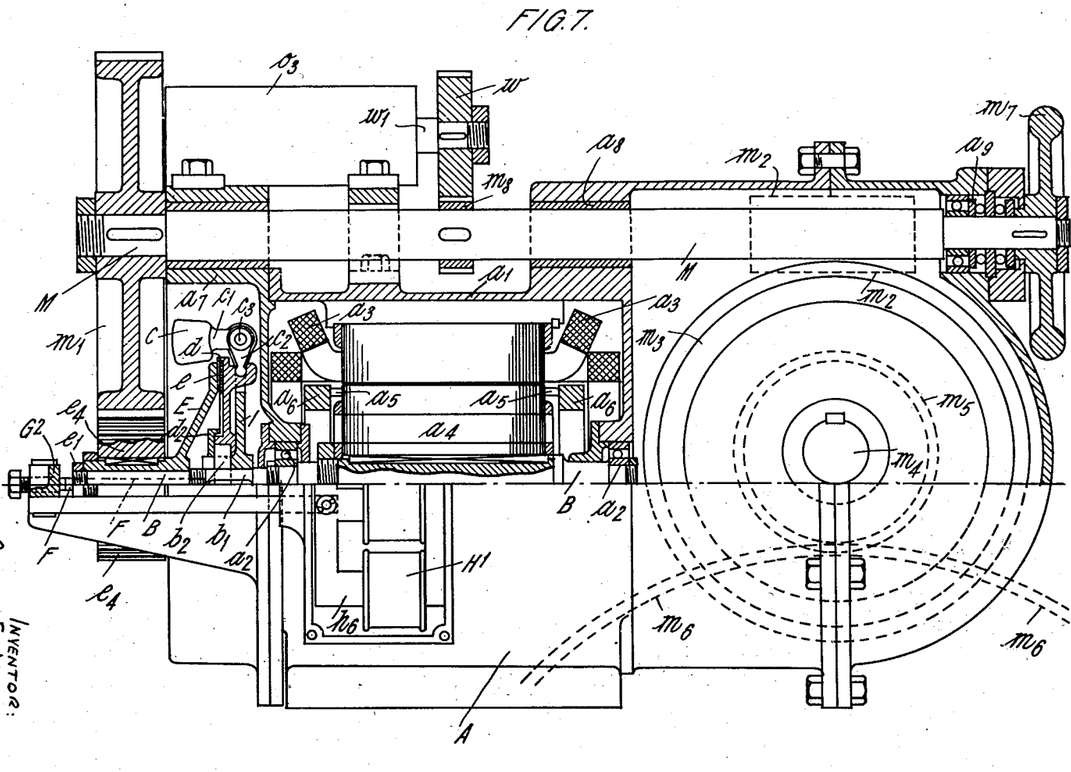
Fig. 7 being an elevation in part section on a medial longitudinal plane.

Referring now to Figs. 7 and 8 which illustrate the application of the invention to the power controlling gear for opening and closing a stop valve, say a steam stop valve;—the construction of the motor A, the clutch D, E, the actuating rod F and the cotter $b^2$ is substantially as described in connection with Figs. 1 to 5. The clutch control rod F is actuated by a lever G$^2$ corresponding with the lever G' described. The lever G$^2$ is connected by the rod $h^8$ to the plunger $h^9$ of a solenoid H$^2$, the winding $h^3$ of which is connected to the switchgear as hereinafter described.

The lever G$^2$ may be fitted with a dashpot K as described in connection with Fig. 6$^B$. This is shown in Fig. 8$^A$; the lever G$^2$ is fitted with a spring $g^{11}$ and is operated through the rod $h^8$ by the solenoid H$^2$ as in Fig. 8; the dashpot mechanism in Fig. 8$^A$ is the same as that described in connection with Fig. 6$^B$ and the several parts are correspondingly lettered.

The clutch member E, in this arrangement, instead of being fitted with a sprocket wheel $e^3$ as in Figs. 1 to 5, is fitted with a pinion $e^4$ which gears with a wheel $m^1$ mounted on an intermediate shaft M carried in bearings $a^7$ and $a^8$ and a thrust bearing $a^9$, all carried from the motor casing or an extension thereof. The shaft M is fitted with a worm $m^2$ gearing with the worm wheel $m^3$ mounted on the shaft $m^4$ carrying a pinion $m^5$ gearing with the wheel $m^6$ which operates the nut or the like by which the valve spindle is opened and closed. The shaft M is fitted with a hand wheel $m^7$ by which the gear can be operated by hand.

Figures 11, 15:
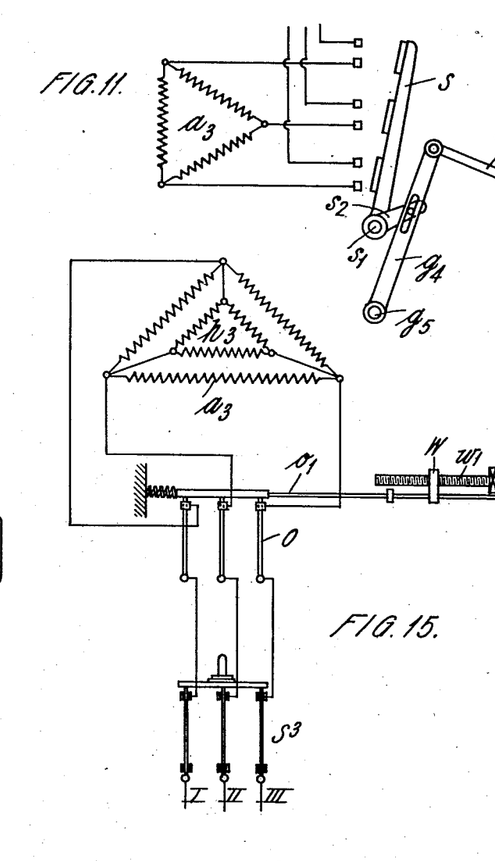

The shaft M has also mounted on it a pinion $m^8$ which gears with a wheel $w$ mounted on a shaft $w^1$ having a screwed portion on which fits a nut W held against rotation (see Fig. 15), which nut therefore is moved from end to end of the casing $o^3$ as the valve is opened and closed. A limit switch O arranged as hereinafter described is fitted with a tappet $w^5$ with which the nut W engages.

Where the driving mechanism and the gear it drives has only to close the valve to be operated, the arrangement of the stop motion nut W and the limit switch O is as shown in Fig. 15, in which $S^3$ is the main switch, which when closed connects the blades of the limit switch O to the supply mains; the contacts of the limit switch are connected to the stator winding $a^3$ of the motor, and to the winding $h^3$ of the solenoid $H^2$ controlling the lever $G^2$; the windings $a^3$ and $h^3$ being connected in parallel.

When the valve has been closed the nut W reaches the limit of its corresponding movement and acting on the tappet $w^5$ on the limit switch rod $o^1$, opens the limit switch O and disconnects the motor winding and the windings $h^3$ of the solenoid $H^2$ from the supply mains and so permits the spring $g^{11}$, Fig. 8, to operate the lever $G^2$ and rod F and render the rotating weights C inoperative.

Figure 16:
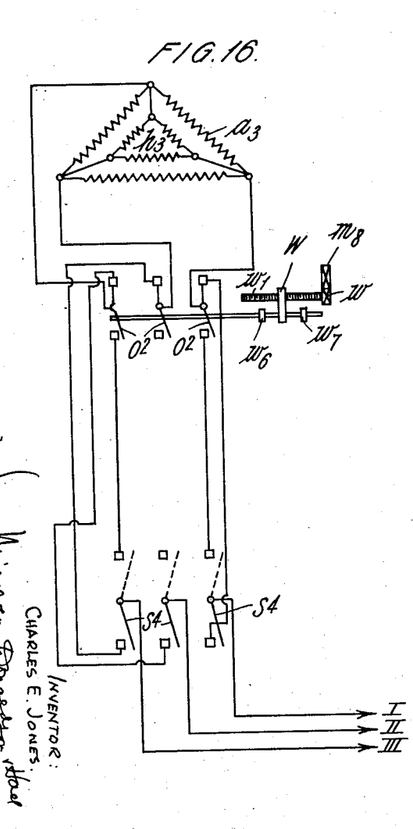

Should the gear be required to both close and open the valve, the limit switch $O^2$ in the casing $o^3$ is arranged as shown in Fig. 16.

Figure 17:
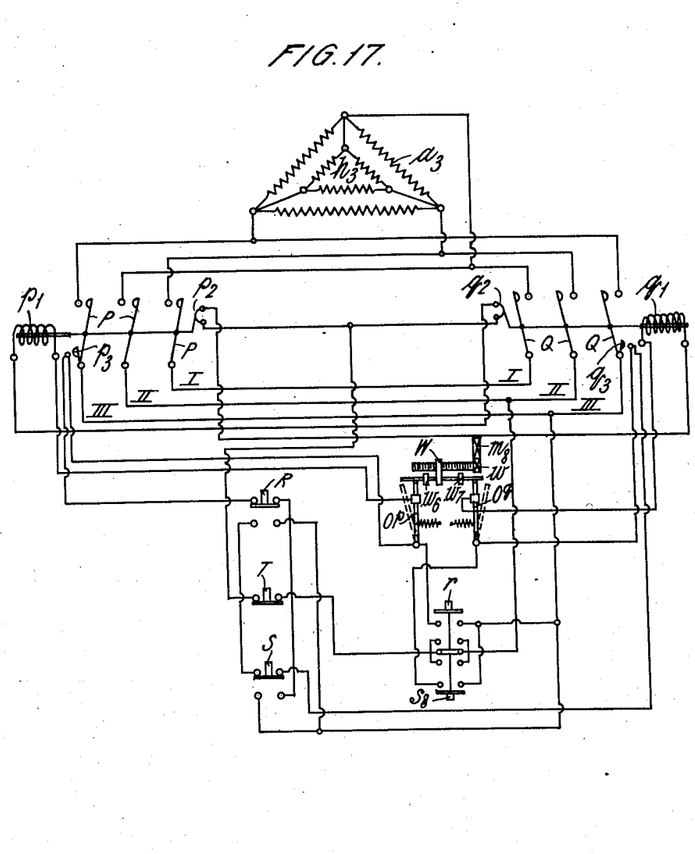

The main switch $S^4$ is a two-way switch, in one position it connects the mains I, II, III to one set of contacts of the limit switch $O^2$, which is a two-way throw-over switch; in the other position it connects the said mains to the other set of limit switch contacts, but with two of the phases reversed. The limit switch $O^2$ is operated by the stop motion nut W acting on tappets $w^6$ and $w^7$; at the end of the closing movement of the valve the switch $O^2$ is moved to the position in which it makes the contacts necessary for the reverse direction of rotation of the motor, viz;—that by which the valve is opened, and this movement disconnects the solenoid winding $h^3$ and the stator winding $a^3$ from the mains, and they are not again connected till the switch $S^4$ is moved to its opposite position; the motor then upon rotates so as to open the valve; at the end of the opening movement a similar, but reverse movement to that described takes place by the operation of the other tappet.

Where it is desired that the gear shall not only be adapted to open and close the valve, but also to give "inching" opening, and "inching" closing movement the arrangement of the stop motion, the limit switch and contactors and push button switches is as shown in Fig. 17.

In this case the windings, $a^3$, of the stator of the motor, and $h^3$ of the solenoid $H^2$ are connected in parallel, and are also connected to the contacts of closing and opening contactors P and Q actuated by solenoids $p^1$ and $q^1$, and fitted with interlocking switches $p^2$ and $q^2$, and maintaining switches $p^3$ and $q^3$. The switches $p^2$ and $q^2$ prevent the solenoid of a contactor being energized unless the other contactor be open; the respective blades of the contactor are connected to the supply mains, I, II and III. $O_p$ and $O_q$ are limit switches. R, S and T are respectively the opening, closing and stopping press-button switches, and $r$ and $s^8$ are respectively the "inching" opening and "inching" closing press-button switches.

The opening press-button switches R and $r$ when operated connect the solenoid $p^1$ across two of the phases through a limit switch $O_p$; and the closing press-button switches S and $s^8$, when operated, connect the solenoid $q^1$ across two of the phases through the limit switch $O_q$; these respective solenoids when the respective contacts P or Q and switches $p^2$ or $q^2$ are closed are directly connected across the said phases through the respective limit switches by the maintaining switches $p^3$ and $q^3$. The press-button switches when in the inoperative position close inter-connected contacts which, in known manner, make it impossible simultaneously to render more than one press-button switch operative at the same time.

When the valve is fully closed the stop motion sliding nut W operates the tappet $w^6$ and opens the limit switch thus de-energizing the solenoid $p^1$ of the closing contactor P, which then opens and disconnects the windings $a^3$ and $h^3$ from the mains; in like manner when the valve is fully open the nut W operates the tapet $w^7$ and opens the limit switch $O_q$ and disconnects the said windings. The valve operating movement produced by operating either of the press-button switches R or S continues after the said switch is released, and until the appropriate limit switch is operated by the stop motion; but the said movement produced by closing either of the press-button switches $r$ or $s^8$ is arrested when the press-button is released, or when the corresponding limit switch is opened.

Figure 9:
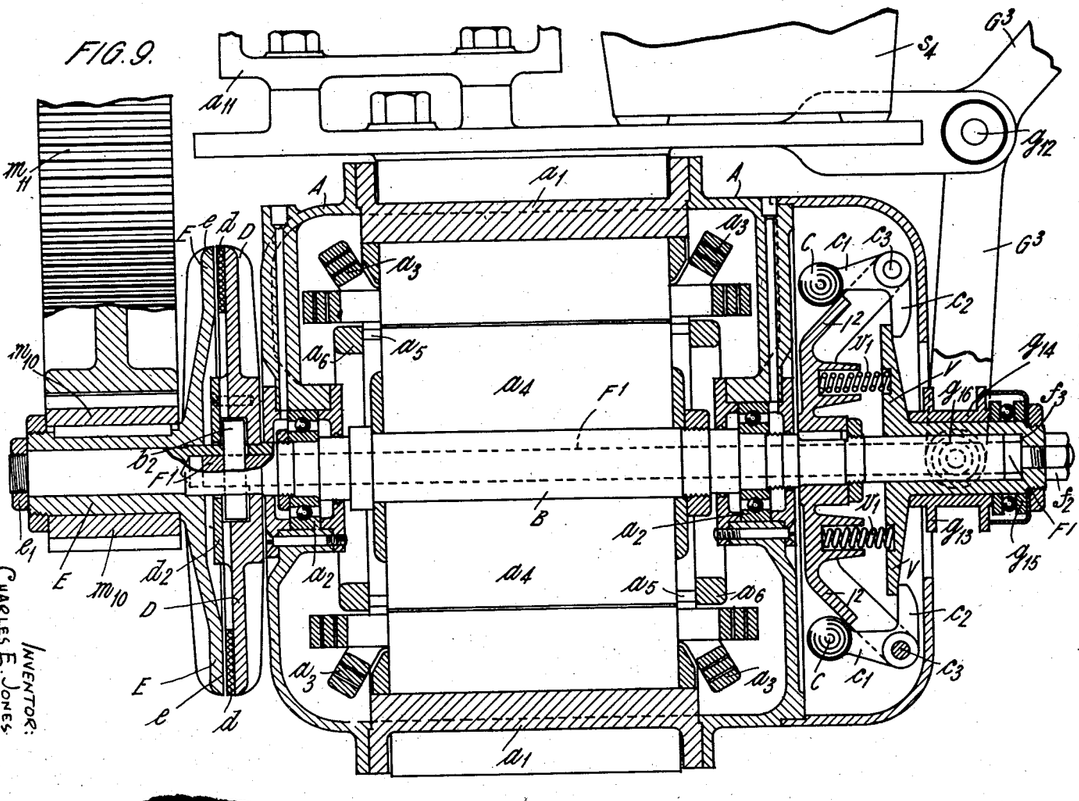
Fig. 9 being an elevation partly in medial longitudinal section.
Figure 10:
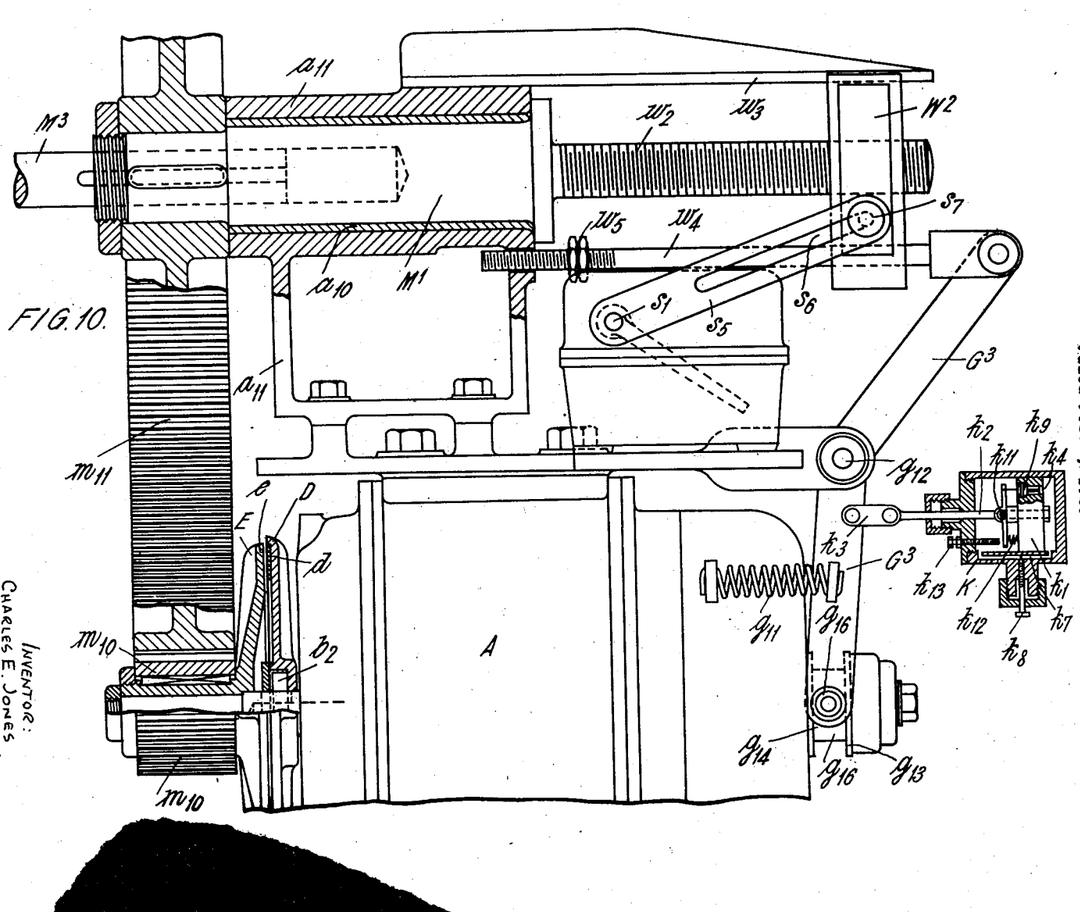
Fig. 10 being an outside elevation partly in section, to a reduced scale.

Referring now to Figs. 9 and 10; the arrangement of the motor and clutch gear is similar to that described in connection with Figs. 7 and 8, except that the rotating weights are located at one end of the motor casing and the clutch members at the other, and the clutch control means are mechanically connected to the stop motion fitted to the valve operating gear.

The carrier plate $I^2$, on which the levers $c^1$, $c^2$ carrying the rotating weights C are pivoted is keyed to the motor shaft, and the said levers are controlled by an axially movable disc V feathered on the motor shaft and rotating with it and the weights C; springs $v^1$ are interposed between the carrier plate $I^2$ and disc V, and the latter is connected to the one end of the sliding rod $F'$ passing through a bore in the motor shaft, the connection being made between the nut $f^2$ and the shoulder $f^3$. The other end of the sliding rod is connected to the driving member D of the clutch by a cotter $b^2$, fixed to the rod $F'$ and passing through slots in the motor shaft, its ends engaging with the member D and being held in place by the cap $d^2$, and serving to drive the member D and to transmit to it the engaging pressure produced by the weights C. The driven member E of the clutch is freely mounted on the motor shaft and held fixed axially thereon is the nut $e^1$.

The sliding rod $F'$ is connected to a stop motion comprising a part moving with the valve to be operated, say the sliding nut $w^2$, shown in Fig. 10; the connection is made, in this modification, by means of a lever $G^3$ pivoted at $g^{12}$ and having bowed arms provided with rollers $g^{16}$ fitting the groove $g^{13}$ in the sleeve $g^{14}$ mounted on the boss of the plate V and transmitting the operating thrust through the bell thrust bearing $g^{15}$.

The driven member of the clutch is fitted with a spur wheel $m^{10}$ gearing with a wheel $m^{11}$ keyed to a shaft $H'$ (see Fig. 10) carried in a bearing $a^{10}$ in the frame $a^{11}$ mounted on the motor and keyed to the shaft $M^3$ which imparts opening and closing movements to the valve. The shaft $M'$ has a screwed prolongation $w^2$ on which the stop motion nut $W^2$ is threaded; the nut is guided and held against rotation by the guide $w^3$, and the tappet rod $w^4$ is connected to the upper end of the lever $G^3$; when the valve is fully closed the nut $W^2$, which then has been traversed to the left, engages the adjustable tappet nuts $w^5$, and the tappet rod $w^4$ turns the lever $G^3$ so it pulls the rod $F'$ and the disc V to the right and this renders the moving weights C inoperative to produce engaging pressure between the clutch members; this movement also, preferably, draws the driving member of the clutch clear of the driven member.

The control switch S of the motor is enclosed in the switch casing $s^4$, the spindle $s^1$ of the switch being keyed to a lever $s^5$ having a slot $s^6$ which engages with a pin $s^7$ fixed to the nut $W^2$, so that the latter, when the valve has been completely closed, opens the switch S at the same time that the clutch controlling gear is operated. The mechanism shown in Figs. 9 and 10 is suitable for driving gear adapted only to close the valve. The lever $G^3$ may, however, in this modification be actuated by electro-magnetic means as described in connection with Figs. 7 and 8 and Figs. 15 to 17, and in order to provide the torque necessary, to open a valve which has been closed very tightly on to its seating, the dashpot or the like device of Fig. $6^B$, or the two-switch arrangement of Fig. 14 may be employed, so that the motor and weights may attain maximum speed before the pressure due to the weights is permitted to cause engagement of the clutch members, and then to cause a sudden engagement.

In Fig. 10 a dashpot K having the same mechanism as that described in connection with Fig. $6^B$, is shown fitted to the lever $G^3$ which lever is also fitted with a spring $g^{11'}$. When the part $W^2$ releases the tappet $w^5$ the spring $g^{11'}$ tends to actuate the lever $G^3$ the dashpot K ensuring the necessary time interval between the closing of the motor control switch and the operation of the clutch control mechanism.

Having now fully described my invention, I declare that what I claim and desire to secure by Letters Patent is:—

1. In driving, starting and stopping means for machines, in combination;—a motor; a friction clutch, one element of which is driven by the motor and the other element of which is adapted to drive the machine; rotating weights, driven by the motor and, when free, adapted to be moved outwardly by centrifugal force and to cause frictional engagement between the two clutch elements; and control means, connected to the rotating weights and to a part of the machine to which movement is given when the machine is to be started and stopped, and adapted to control the extent of outward movement imparted by centrifugal force to the said weights; substantially as described.

2. In driving, starting and stopping means for machines, in combination;—a motor; a friction clutch, one element of which is driven by the motor and the other element of which is adapted to drive the machine; rotating weights driven by the motor and, when free, adapted to be moved outwardly by centrifugal force and to cause frictional engagement between the two clutch elements; and controlling means connected to the rotating weights and a part of the machine to which movement is given when the machine has to be stopped and started, movement of the said controlling means being adapted to determine the extent to which the weights are permitted to move outwardly under centrifugal force, and so determine the magnitude of engaging pressure between the frictional surfaces of the clutch caused by the said outward movement of the weights; substantially as described.

3. In driving, starting and stopping means for machines, in combination;—an electric motor; a switch for controlling the said motor; a friction clutch, one element of which is driven by the motor and the other element of which is adapted to drive the said machine; rotating weights driven by the motor and, when free, adapted to be moved outwardly by centrifugal force and to cause frictional engagement between the two clutch elements; and control means, connected to the rotating weights and to a part of the machine to which movement is given when the machine is started and stopped, and adapted to control the extent of outward movement imparted by centrifugal force to the said weights; and means for coupling the said electric switch to the clutch controlling means so as to co-ordinate their operation; substantially as described.

4. In driving, starting and stopping means for machines, in combination;—an electric motor; a switch for controlling said motor; a friction clutch, one element of which is driven by the motor and the other element of which is adapted to drive the said machine; rotating weights driven by the motor and when free adapted to be moved outwardly by centrifugal force and to cause frictional engagement between the two clutch elements; and control means connected to the rotating weights and to a part of the machine to which movement is given when the machine is started and stopped, and adapted to control the extent of outward movement imparted by centrifugal force to the said weights; a solenoid the winding of which is energized when the switch is closed and the armature of which is connected to and actuates the clutch control means; and a time-lag device on the clutch control means adapted to delay the operation of the latter for a suitable time interval after the motor switch has been operated; substantially as described.

5. In driving, starting and stopping means for machines, in combination;—an electric motor; a switch for controlling the motor; a friction clutch; rotating weights to actuate the clutch; clutch control means; a solenoid to actuate the clutch control means; a second switch which when closed connects the winding of the solenoid to the supply mains; a time-lag device fitted to the second switch adapted to delay its operation for a suitable time interval after the operation of the first switch; and means connecting the switches together which tend when the first switch is closed to close the second switch; substantially as described.

6. In driving, starting and stopping means for machines in combination;—an electric motor; a control switch for the motor; a friction clutch; rotating weights to actuate the clutch; and clutch control means; a disc mounted on and driven by the motor shaft and located within the motor casing on which disc the rotating weights are pivoted; a sliding rod located in the bore of the motor shaft; one end of the said rod engaging the clutch member driven by the motor, the rod being adapted to control the outward movement of the rotating weights; a pivoted lever bearing on the other end of the said rod; and means connecting the said lever to the part of the machine to which movement is given when the machine is stopped and started; substantially as described.

7. In driving, starting and stopping means for machines in combination;—an electric motor; a control switch for the motor; a friction clutch; rotating weights to actuate the clutch; clutch control means; a disc mounted on and driven by the motor shaft and located within the motor casing, on which disc the rotating weights are pivoted; a sliding rod located in the bore of the motor shaft, one end of the said rod engaging the clutch member driven by the motor, the rod being adapted to control the outward movement of the rotating weights; a pivoted lever bearing on the other end of the said rod; and means connecting the said lever to the motor control switch and to a part of the machine to which movement is given when the machine is stopped and started; substantially as described.

8. In driving, starting and stopping means for machines in combination;—an electric motor; a control switch for the motor; a friction clutch; rotating weights to actuate the clutch; clutch control means; a carrier plate mounted on and driven by the motor shaft and located within the motor casing; bell-crank levers mounted on the carrier plate and carrying the rotating weights; a rod located within the bore of the motor shaft; a disc mounted on the said rod and moving axially therewith and adapted to engage the tails of the bell crank levers; a cotter passing through the said rod and the motor shaft and engaging the clutch member driven by the motor and forming the driving means between the motor shaft and the said member; a lever adapted to impart axial movement to the said rod; and means connecting the said lever to a part of the machine to which movement is given when the machine is stopped and started; substantially as described.

9. In driving, starting and stopping means for machines, in combination;—an electric motor; a control switch for the motor; a friction clutch; rotating weights to actuate the clutch; clutch control means; a part which by rotation is adapted to close a steam valve; gearing between the driven member of the clutch and the said part, a screw-threaded shaft driven by the said part; a non-rotatable nut fitting the said screw-threaded shaft and moved axially thereby; a tappet rod; an adjustable tappet on the rod adapted to be engaged by the non-rotatable nut at the ends of its axial travel; a control switch connected to the tappet rod adapted to connect the motor to the supply mains; a solenoid the winding of which is energized when the said switch is closed; and means connecting the armature of the solenoid to the clutch control means; substantially as described.

10. In driving, starting and stopping means for machines as claimed in claim 9, connecting the armature of the solenoid to a lever adapted to operate the control means of the clutch, and fitting said lever with a time-lag device whereby a suitable time interval elapses between the actuation of the switch and the actuation of the control means; substantially as described.

11. In driving, starting and stopping means for machines, in combination;—an electric motor; a control switch therefor; a friction clutch; one element of which is driven by the rotor of the motor and the other element of which drives the machine; rotating weights carried by the motor and adapted by centrifugal force to cause frictional engagement between the elements of the clutch; means controlling the movement imparted to the weights by centrifugal force; a part to which movement is given when the machine is stopped and started; means through which the said part actuates the motor control switch and means through which the said part actuates the control gear; substantially as described.

12. In driving, starting and stopping means as claimed in claim 11, a time limit device interposed between the part to which movement is given when the machine is stopped and started and the clutch control mechanism which is adapted to provide a time interval between the energizing of the solenoid winding and the operation of the clutch control means; substantially as described.

13. In driving, starting and stopping means for machines, in combination;—an electric motor; a control switch therefor; a friction clutch, one element of which is driven by the rotor of the motor and the other element of which drives the machine; rotating weights carried by the motor and adapted by centrifugal force to cause frictional engagement between the elements of the clutch; means controlling the movement imparted to the weights by centrifugal force; a part to which movement is given when the machine is stopped and started; means through which the said part actuates the motor control switch; a solenoid the winding of which is energized when the said switch is closed; means connecting the armature of the solenoid with the clutch driving means; a dashpot connected to the said control means and adapted to delay the actuation thereof by the solenoid armature for a suitable time interval after the energizing of the winding of the solenoid; substantially as described.

14. In driving, starting and stopping means for machines, in combination;—an electric motor; a control switch therefor; a friction clutch, one element of which is driven by the rotor of the motor and the other element of which drives the machine; rotating weights carried by the motor and adapted by centrifugal force to cause frictional engagement between the elements of the clutch; means controlling the movement imparted to the weights by centrifugal force; a part to which movement is given when the machine is stopped and started; means through which the said part actuates the motor control switch, a solenoid which when energized actuates the clutch control means; a switch which when closed energizes the solenoid; a spring connecting the motor control switch and the solenoid switch and tending when the motor switch is closed to close the solenoid switch; and a dashpot connected to the solenoid switch and adapted to delay its operation for a suitable time interval after the motor control switch has been closed; substantially as described.

15. In driving, starting and stopping means for machines in combination;—an electric motor; a control switch for the motor; a friction clutch; rotating weights to actuate the clutch; clutch control means; a part which by rotation is adapted to close a steam valve; gearing between the driven member of the clutch and the said part; a screw-threaded shaft driven by the said part; a non-rotatable nut fitting the said screw-threaded shaft and moved axially thereby; a tappet rod; an adjustable tappet on the rod adapted to be engaged by the non-rotatable nut at the ends of its axial travel; a main control switch actuated by the tappet; a solenoid adapted when energized to operate the clutch control gear; the motor winding and the winding of the solenoid being connected in parallel to the supply mains through the said main control switch; substantially as described.

16. In driving, starting and stopping means for machines as claimed in claim 15 and adapted to drive the valve closing gear, arranging the main control switch in the form of two separate solenoid operated and interlocked contactors respectively adapted, when closed, to make direct and reversed connections of the motor for opening and closing the valve, said contactors being adapted to be respectively closed by circuits completed by push-button switches through respective limit switches, one limit switch being opened by the stop motion when the valve is fully closed and the other opened by the stop motion when the valve is fully opened; substantially as described.

In witness whereof I set my hand.
CHARLES EDWARD JONES.